May 22, 1923.

P. R. PETERSON

ATTACHMENT FOR HAND SLEDS

Filed Oct. 5, 1921

1,456,335

Peter R. Peterson
INVENTOR

BY J. M. Thomas
ATTORNEY

Patented May 22, 1923.

1,456,335

UNITED STATES PATENT OFFICE.

PETER R. PETERSON, OF SALT LAKE CITY, UTAH, ASSIGNOR TO COASTER COMPANY, A CORPORATION OF UTAH.

ATTACHMENT FOR HAND SLEDS.

Application filed October 5, 1921. Serial No. 505,540.

*To all whom it may concern:*

Be it known that I, PETER R. PETERSON, a citizen of the United States, residing at Salt Lake City, in the county of Salt Lake and State of Utah, have invented certain new and useful Improvements in Attachments for Hand Sleds, of which the following is a specification.

My invention relates to hand sleds for children, and has for its object to provide attachments which may be easily and quickly secured on the runners of a hand sled whereby wheels may be secured to the runners of the sled and said sled may be used by children to coast down hill on pavements, side walks or smooth roadways, and may be steered to the right or left as desired.

These objects I accomplish by the device illustrated in the accompanying drawings in which similar letters and numerals of reference indicate like parts throughout the several views, and as described in the specification and pointed out in the appended claims.

Figure 1:
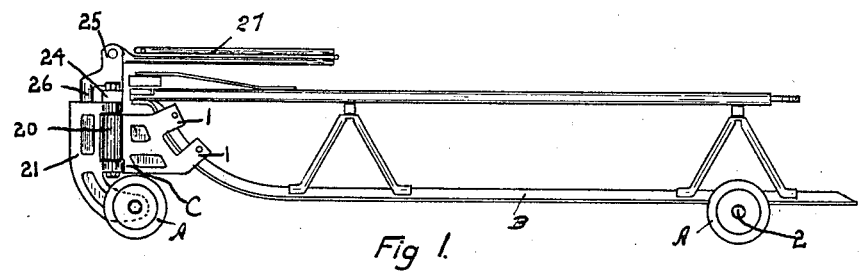
Figure 2:
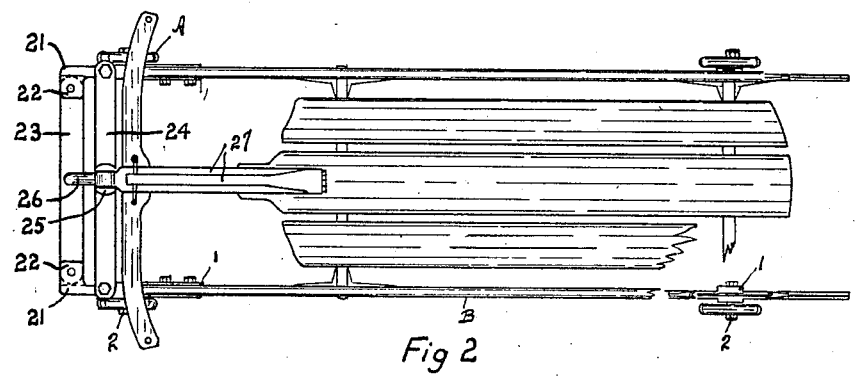
Figures 3, 4, 5:
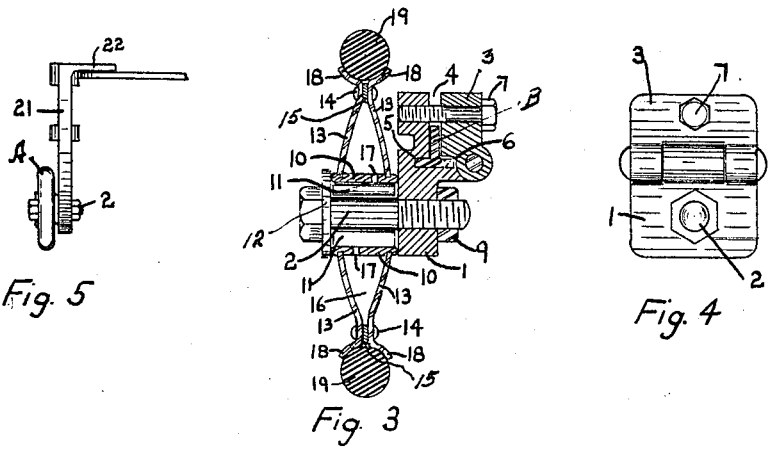

In the drawings in which I have shown a substantial embodiment of my invention, Figure 1 is side elevation of a hand sled with my attachments thereon. Figure 2 is a plan view of the same. Figure 3 is a vertical section of one of the wheels and means to fasten it on the runner of the sled somewhat enlarged as to the other views. Figure 4 is an elevation of one of the hinged clamps. Figure 5 is a front elevation of one of the front wheels and one leaf of the hinged clamp.

The present invention is to be fastened on the runners of the common hand sled having an iron runner and designated as a flexible runner, but as will be obvious it may be readily fastened on the runners of any make of sleds and consists of four wheels A which are to be detachably fastened on the runners B of the sled. I use a specially designed clamp for securing the wheels to the runner and the space between each pair of wheels is the same in order that the front and rear wheels may track. The clamp consists of a metal block 1, bored and internally threaded to receive a portion of the stub axle 2 of the wheel, and to which block is hingedly connected the other jaw 3 of the clamp. A space 4 is left between the jaws and recesses 5 and 6 are respectively cut into the faces of said jaws to receive the runner of the sled. A tap bolt 7 is used to hold said clamp firmly against the sled runner B. The same type or style of clamp is used to fasten both the rear and front wheels to the runners. The wheels A are carried on and journalled on the stub axles 2, which are each screwed into said blocks 1 and locked by any of the common lock nuts 9. The wheels of special construction for this use are fastened on said clamp by the said axle 2 being passed through the hub 10 and when said nut 9 is screwed on said axle the roller bearings 11 are held in place as a bearing for the wheel. A washer 12 on one end and the face of the clamp 1 holds the rollers of the bearing in place. The wheels each consist of contiguous disks 13, made of sheet steel and pressed into form, and fastened by the rivets 14. An annular paper gasket 15 is held by said rivets in place between each pair of said disks 13, to prevent noise or rattling and to seal the interior of said wheel for a lubricating reservoir 16. The hub 10 of the wheel has its end portions outwardly flanged to bear against the face of said disks 13 and may be brazed or otherwise fastened to said disks. An oil hole 17 is provided entering said reservoir 16 from the interior of said hub. The peripheric edges of said disks 13 are outwardly flared as at 18 to engage and hold the tire 19 in place when the disks are fastened together. The same clamping means are used to fasten the front wheels on the runner as are used on the rear wheels except that the form of block 1 is changed, and made into a vertically disposed hinge member C of two parts, as shown in Figures 1 and 5. In that form a web portion forms one leaf 20 of the hinge while another web portion forms the other leaf 21. The upper portion of the clamp block 1 and leaf 20 are integral, while the lower portion of the forward goose-neck wheel supporting element and the leaf 21 are integral. Oppositely turned lugs 22, each integral with leaf 21, are provided on the upper ends of each leaf 21, and a link 23 is pivoted between and connects said lugs. On the upper ends of the pins of the two hinges C is secured the cross head 24, and centrally thereon is the swivel block 25 having an arm 26. One end of which arm is pivoted in the said link 23. A handle or tongue 27 is pivoted in said swivel block 25 by which the leaves 21 may be swung to the right or left to guide the front wheels and thereby the sled. I thus provide new wheels, strong and quickly fastened on the runner of a hand sled with novel clamping means, and new steering features connecting the front wheels with the same clamping means used on rear wheels.

Having thus described my invention I desire to secure by Letters Patent and claim:—

1. In a hand sled attachment the combination of wheels; roller bearings held therein by stub axles which are secured to clamp blocks adapted to engage the runners of the sled; a hingedly connected clamp block for each of the front wheels; a link connecting a leaf of the hinge portion of each of the front clamps; a cross head connecting the pins of the front clamp blocks; a swivel block mounted on said cross head; an arm of said swivel block pivoted in said link; and a handle to partially rotate said swivel block and thereby one leaf of the clamp block to turn the front wheels.

2. A hand sled attachment comprising wheels adapted to be clamped on the sides of the runner by stub axles, a block recessed to engage one side of a runner and bored to receive transversely one of said stub axles, a clamping jaw hingedly connected with said block, means to draw the said jaw and block toward each other; the clamp for each front wheel having a portion of said block extended as one leaf of a vertical hinge, a gooseneck member formed as the other leaves of said vertical hinge, a pin connecting said leaves, a cross head secured on the upper portion of the pins of both vertical hinges, a link connecting the goose-neck portions of said vertical hinges, a swivel block in said cross head having an arm pivoted in said link, and a tongue by which said link is shifted relative to said cross head.

In testimony whereof I have affixed my signature.

PETER R. PETERSON.